United States Patent

Leeb

[11] Patent Number: 5,853,644
[45] Date of Patent: Dec. 29, 1998

[54] DEVICE FOR PRESSING PLASTICS

[75] Inventor: Karl-Erik Leeb, Lillebo, Sweden

[73] Assignee: Telefonaktiebolaget LM Ericsson, Stockholm, Sweden

[21] Appl. No.: 750,620

[22] PCT Filed: Jun. 8, 1995

[86] PCT No.: PCT/SE95/00687

§ 371 Date: Dec. 13, 1996

§ 102(e) Date: Dec. 13, 1996

[87] PCT Pub. No.: WO95/34419

PCT Pub. Date: Dec. 21, 1995

[30]   Foreign Application Priority Data

Jun. 14, 1994  [SE]  Sweden ................................. 9402085

[51] Int. Cl.⁶ ...................................................... B29C 43/04
[52] U.S. Cl. ......................... 264/322; 264/323; 264/327; 425/384; 425/407
[58] Field of Search ................................... 264/323, 327; 425/407, 384

[56]            References Cited

FOREIGN PATENT DOCUMENTS

| 0367441 A2 | 5/1990 | European Pat. Off. . |
| 1197607 B1 | 7/1965 | Germany . |
| 2747797 A1 | 4/1979 | Germany . |
| 2950528 C2 | 7/1980 | Germany . |
| 2141376 | 12/1984 | United Kingdom . |

OTHER PUBLICATIONS

International Search Report mailed on Sep. 23, 1995 corresponding to International Application No. PCT/SE95/00687.

*Primary Examiner*—Jan H. Silbaugh
*Assistant Examiner*—Mark Eashoo
*Attorney, Agent, or Firm*—Burns, Doane, Swecker & Mathis, L.L.P.

[57]            ABSTRACT

An apparatus for pressing plastics that includes a press tool which is adapted to be pressed against a press surface with the aid of pressure means. The press surface includes a flat surface which is common to a thermostat-controlled cold device and a thermostat-controlled hot device. The tool can be moved from one thermostat-controlled device to the other thermostat-controlled device while pressure is being applied to vary the temperature of the tool.

15 Claims, 1 Drawing Sheet

DEVICE FOR PRESSING PLASTICS

TECHNICAL FIELD

The present invention relates to plastic pressing apparatus which includes a rapid heating and cooling facility.

TECHNICAL FIELD

There is often a need to heat and cool a plastic workpiece, particularly a thermoplastic workpiece, while applying pressure thereto. This need often exists when wishing to obtain particularly fine surfaces on the workpiece, or when encapsulating electronics in screening or shielding laminates that are comprised of thermoplastic foils and metal foils and where electrical contacting is desired, as described in Swedish Specification 9300966-0.

In the case of existing plastic pressing apparatus, the desired pressure is often generated with the aid of hydraulic piston-cylinder devices, where the force is distributed over the tool through the medium of a steel pressure plate. The pressure plate must be relatively thick, in order to have the rigidity necessary to distribute a uniform pressure force over the whole of the surface to be pressed, particularly when pressing workpieces of large surface areas.

In the case of present-day pressing apparatus, the whole of the pressure exerting plate, or at least a significant part of the plate, is thermostat-controlled so as to adjust the temperature to a desired level. The plate, which thus also transmits heat, is often provided with passageways through which attemperated liquid is flushed. The plate may alternatively be heated with the aid of electric heating elements placed in direct thermal contact with the pressure-exerting plate.

When the process is to be carried out at varying temperatures, existing apparatus have the limitation that the relatively large volumes of materials which make up the pressure and heat-transmitting plate, the tool and the workpiece require the input of large quantities of energy to change the temperature of the material, and that this energy flow is limited to the energy that can be developed in electrical heating elements for instance, and also by the rate of the temperature change of the thermal resistances present in the construction, these resistances often being dominated by contact resistances between various parts.

As a result, the total heating time and cooling time in a press for pressing a flat laminate at a pressure of 500 N/cm$^2$ is often in the order of thirty minutes. When pressing thermoplastic plates where the material itself affords a rapid working cycle, the slow temperature change constitutes a serious drawback from a production-economic aspect.

SUMMARY OF THE INVENTION

An object of the present invention is to provide a plastic pressing apparatus which solves the aforesaid problem associated with the use of state-of-the-art techniques.

The apparatus is comprised of several thermostat-controlled-devices against which a pressing tool can be pressed by a tool holder, wherein the tool can be moved between the thermostat-controlled devices while maintaining a pressing force, and wherein a large part of the tool surface comes into contact with the thermostat-controlled device. The surfaces of the thermostat-controlled device and that part of the pressing tool that lies against said device are coated with a substance which reduces friction and increases thermal conductivity lubricated, so as to reduce friction and the thermal resistance.

As a result of the construction of the inventive apparatus, only a minimum amount of material is subjected to temperature variations, meaning that only small quantities of energy are required to effect such variations, and the joints between the thermostat-controlled device and the tool have low thermal resistance, and the thermostat-controlled device can be given a large mass which functions as a thermal buffer.

The time taken to effect these variations in temperature is consequently very short and thus results in a speedy manufacturing cycle, which solves a serious problem associated with present-day plastic pressing apparatus.

The invention will now be described in more detail with reference to a preferred exemplifying embodiment thereof and also with reference to the accompanying drawings.

BEST MODES OF CARRYING OUT THE INVENTION

Two exemplifying embodiments of the invention are described below with reference to the accompanying drawings.

Figure 1:
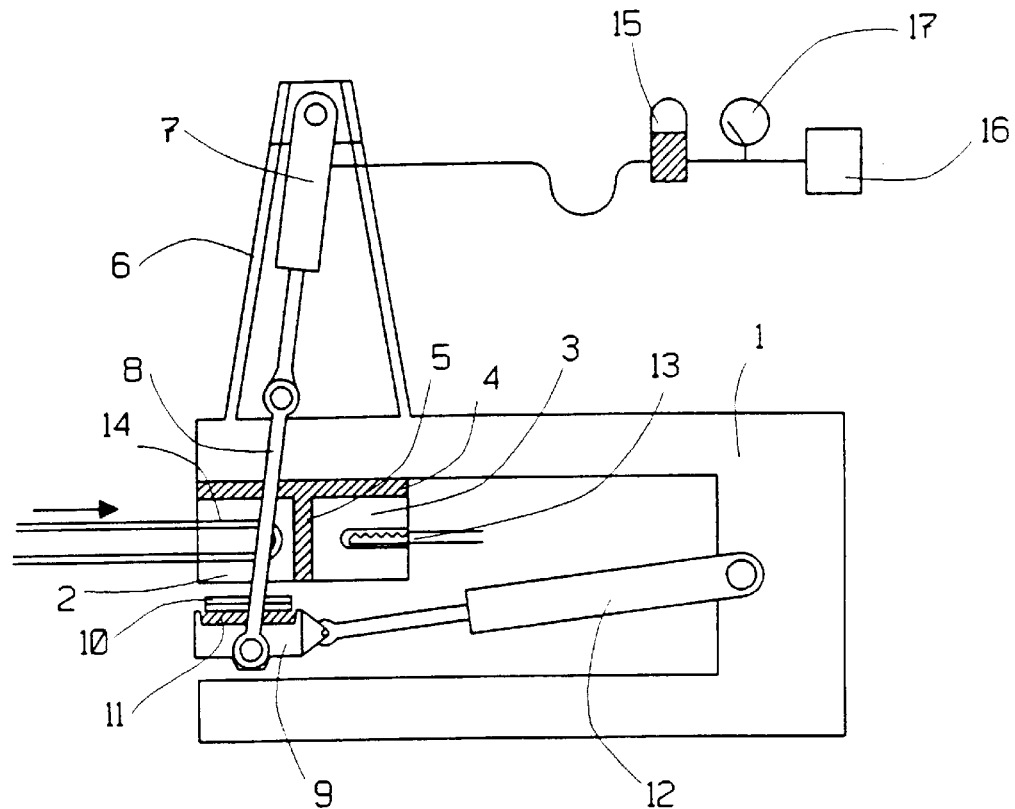
FIG. 1 is a side view of one embodiment of an inventive apparatus.

FIG. 1 shows a stand 1 which has mounted in its upper part a thermostat-controlled cold device 2 and a thermostat-controlled hot device 3, said devices being affixed to the stand 1 through the medium of heat-insulating material 4. The two thermostat-controlled devices 2, 3 are separated from one another by heat-insulating material 5. Mounted centrally on the frame 1, vertically above the thermostat-controlled devices 2, 3, is a pedestal 6 which forms a mounting for a hydraulic piston-cylinder apparatus 7 which functions to exert a pulling force on a tool holder 9 through the medium of a yoke 8.

The force applied by the hydraulic cylinder 7 presses a press tool 10 between the tool holder 9 and the thermostat-controlled devices 2, 3. The tool holder 9 is thermally insulated from the tool 10 by means of thermally insulating material 11. The tool holder 9 and the tool 10 carried thereby can be moved between the cold thermostat-controlled device 2 and the hot thermostat-controlled device 3 by means of a hydraulic piston-cylinder apparatus 12, wherewith the tool 10 slides on a film of lubricant on the undersurfaces of the thermostat-controlled devices 2, 3, these surfaces being flat and parallel.

Energy is supplied to the hot thermostat-controlled device 3 from an electric heating element 13, whereas the cold thermostat-control device 2 is cooled with cold fluid circulated in a cooling channel 14, the energy flows being regulated so that an essentially uniform temperature will prevail in the devices 2, 3.

The yoke 8 and the hydraulic cylinder 7 form a pendulum, with the tool holder 9 attached to the outer end thereof. As the pendulum swings towards the flat thermostat-controlled devices 2, 3, the working length of the hydraulic cylinder 7 will change during the working cycle of the apparatus. In order to compensate for this change in length and also in order to maintain a constant pressure, the apparatus includes a hydraulic accumulator 15 between the hydraulic pump 16 supplying hydraulic fluids to the cylinder 7 and said cylinder. The oil pressure, and therewith the press pressure, between the tool holder and the thermostat-controlled devices 2, 3 can be read-off from a manometer 17.

In a typical working cycle of the apparatus, the pistons of the hydraulic piston-cylinder apparatus 12, 7 are initially in their respective extended positions. The tool 10 carrying the material to be worked is placed on top of the tool holder 9 and the hydraulic cylinder 7 is activated, wherewith pressure is exerted against the cold thermostat-controlled device. The tool holder 9 is then drawn over to the hot thermostat-controlled device 3, by means of the hydraulic piston-cylinder apparatus 12. When the temperature of the material carried by the tool 10 has risen to the level desired, the tool holder 9 and the tool 10 are moved back to the thermostat-controlled cold device 2, and when the temperature in the material has fallen to the level desired, the hydraulic cylinder 7 is expanded and the tool holder 9 therewith lowered so that the tool 10 can be removed.

The tool 10 may be provided with a thermometer, to enable the temperature of the tool to be checked. The temperature of the thermostat-controlled hot device 3 may be considerably higher than the highest tool temperature, and the tool temperature is adjusted by moving the tool holder 9 back to the cold thermostat-controlled device 2 immediately the tool 10 is heated to a maximum temperature. This facility permits a considerably large difference in temperature between the thermostat-controlled devices 2, 3 and the tool 10, resulting in a larger heat flow and quicker temperature adjustment.

Figure 2:
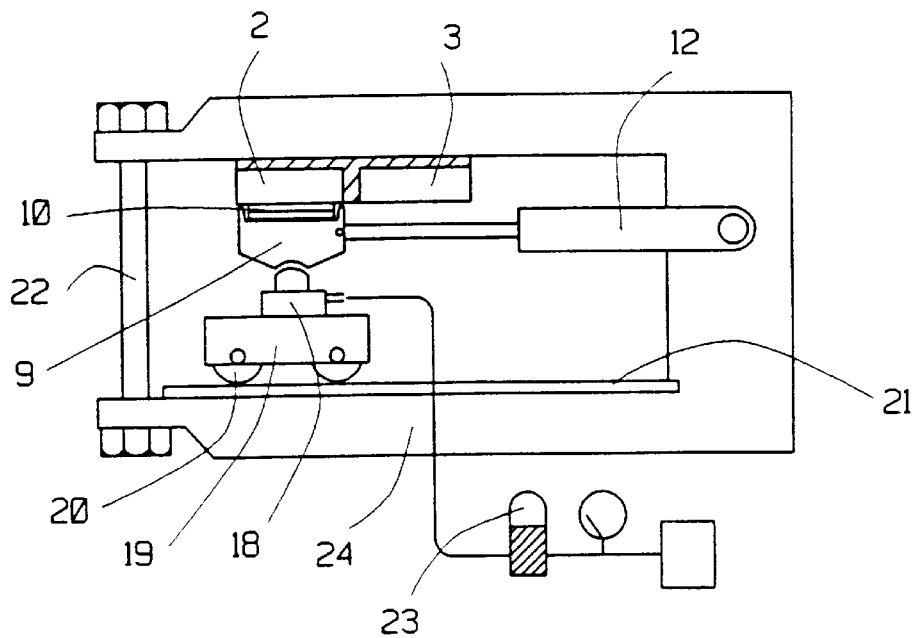
FIG. 2 is a side view of another embodiment of the inventive apparatus.

FIG. 2 illustrates a variant of the apparatus in which the thermostat-controlled devices 2, 3, the tool holder 9, the tool 10 and the hydraulic piston-cylinder device 12 are arranged in the same manner as in the FIG. 1 embodiment. In the FIG. 2 embodiment, the pressing force is obtained through the medium of a hydraulic piston-cylinder device 18 which acts between the bottom and the upper leg of the stand 24. The hydraulic piston-cylinder device 18 is mounted on a carriage 19 which runs on rollers 20 along guides 21. The upper and the lower leg of the stand 24 are held together by a draw bolt 22.

Minor variations in the volume of the hydraulic piston-cylinder device 18 caused by variations in the measurements between the guides 21 and the thermostat-controlled devices 2, 3 are compensated for with the aid of a hydraulic accumulator 23.

It will be understood that the invention is not restricted to the aforedescribed and illustrated exemplifying embodiments thereof and that modifications can be made within the scope of the following claims.

I claim:

1. An apparatus for pressing plastic, comprising:
   a press tool carried by a tool holder, removable from the tool holder, and adapted to be pressed against a press surface;
   a press surface which is flat and common to both a thermostat-controlled cold device and a thermostat-controlled hot device;
   a press device for pressing the press tool against the press surface;
   means for moving the tool holder carrying the press tool between the thermostat-controlled hot device and the thermostat-controlled cold device along the press surface while the press tool is pressed against the press surface with the press device; and
   a temperature of the press tool being changeable by thermal contact with the thermostat-controlled hot and cold devices.

2. An apparatus according to claim 1, wherein the press tool includes a flat surface which when pressed against the press surface abuts the press surface common to the thermostat-controlled hot and cold devices and slides against the press surface such that the press tool is brought into contact with the thermostat-controlled cold device in one position of movement of the press tool against the press surface and into contact with the thermostat-controlled hot device in another position of movement of the press tool against the press surface.

3. An apparatus according to claim 1, wherein the press surface is coated with a substance which reduces friction and enhances thermal conductivity.

4. An apparatus according to claim 1, wherein the thermostat-controlled cold device is cooled with a cold fluid which circulates in a cooling channel, and the thermostat-controlled hot device is heated by an electric heating element, wherein energy flows are controlled so that an essentially even temperature will prevail in respective devices.

5. An apparatus according to claim 1, wherein the thermostat-controlled hot and cold devices are mutually separated by a heat-insulating material.

6. The apparatus according to claim 1, further comprising a piston for moving the tool holder carrying the press tool along the press surface.

7. An apparatus for pressing plastic material, comprising:
   a press tool for carrying a plastic material:
   a tool holder holding the press tool;
   a hot device for raising a temperature of the plastic material carried by the press tool;
   a cold device for lowering the temperature of the plastic material carried by the press tool;
   a press surface against which the press tool carrying the plastic material is to be pressed, the press surface being common to both the cold device and the hot device; and
   a means operatively associated with the press tool for pressing the press tool held by the tool holder against the press surface and for moving the tool holder between the hot device and the cold device wherein the press tool is moved along the press surface to effect raising and lowering of the temperature of the plastic material carried by the press tool.

8. The apparatus according to claim 7, wherein the press tool includes a flat surface, and the means operatively associated with the press tool are for pressing the flat surface of the press tool against the press surface and for moving the flat surface of the press tool along the press surface to effect raising and lowering of the temperature of the plastic material carried by the press tool.

9. The apparatus according to claim 8, wherein at least one of the press surface and the flat surface is coated with a friction reducing substance.

10. The apparatus according to claim 8, wherein at least one of the press surface and the flat surface is coated with a thermal conductivity enhancing substance.

11. The apparatus according to claim 7, wherein the hot device and the cold device are separated by a heat insulating material.

12. The apparatus according to claim 7, wherein the means operatively associated with the press tool is at least one piston cylinder apparatus.

13. The apparatus according to claim 7, wherein the means operatively associated with the press tool includes a piston actuation device for moving the tool holder and the press tool between the hot device and the cold device along the press surface.

14. A method of pressing plastic material comprising the steps of:

carrying a plastic material with a press tool;

holding the press tool with a tool holder;

pressing the press tool held by the tool holder against a press surface common to a hot device and a cold device thereby pressing the plastic material;

moving the tool holder holding the press tool between the hot device and the cold device along the press surface while the press tool is pressed against the press surface, thereby heating and cooling the plastic material during the pressing thereof; and removing the press tool carrying the plastic material from the tool holder.

15. An apparatus for pressing plastic material, comprising:

a press tool carried by a tool holder, the press tool for carrying a plastic material;

a hot device for raising a temperature of the plastic material carried by the press tool;

a cold device for lowering the temperature of the plastic material carried by the press tool;

a press surface against which the press tool carrying the plastic material is to be pressed, the press surface being common to both the cold device and the hot device;

a device for pressing the press tool against the press surface; and a piston for moving the press tool carried by the tool holder between the hot device and the cold device along the press surface while the press tool is pressed against the press surface.

* * * * *